Patented Apr. 14, 1931

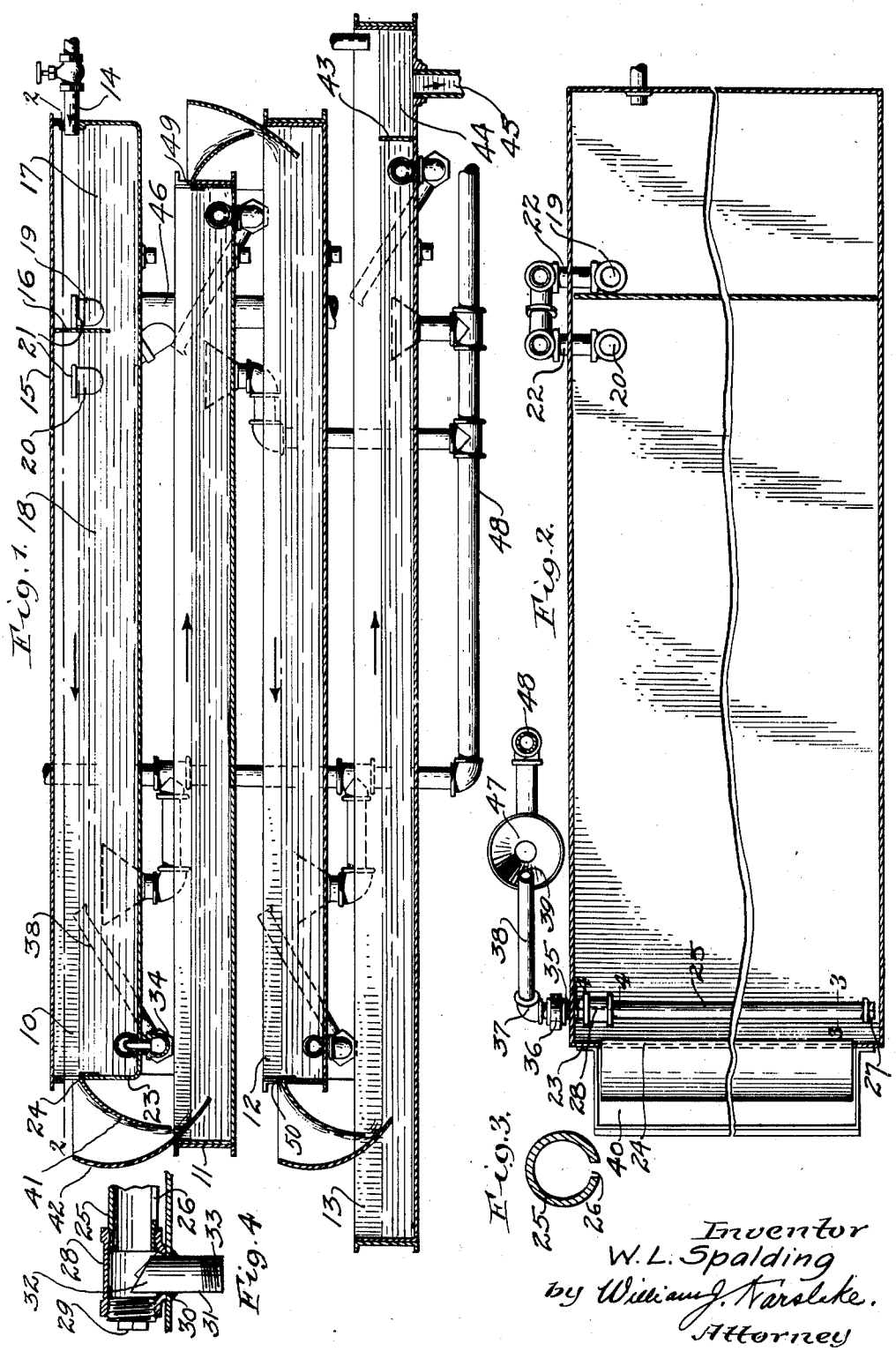

1,800,965

UNITED STATES PATENT OFFICE

WILLIAM L. SPALDING, OF BUFFALO, NEW YORK, ASSIGNOR TO NATIONAL ANILINE & CHEMICAL COMPANY, INC., OF NEW YORK, N. Y., A CORPORATION OF NEW YORK

SEPARATION OF LIQUIDS AND SOLIDS

Application filed November 17, 1926. Serial No. 148,845.

This invention relates to a separation of solids from liquids by a process which utilizes the principle of decantation. In its specific application it relates more particularly to a continuous process for the concentration of a slurry containing indigo and the separation of the concentrated slurry from the liquor with which it is associated, and an apparatus therefor.

In the manufacture of indigo, large volumes of diluted caustic liquor solutions containing indoxyl are subjected to aeration and vigorous agitation which results in the oxidation and conversion of indoxyl to indigo which precipitates in a fine state of subdivision. The separation of the precipitated indigo by filtration from the total body of liquor, as commonly practiced, is economically objectionable in large scale production since it requires a large filter capacity due to the fact that the amount of indigo present is usually only about one to three percent by weight of the total mixture.

The precipitation of indigo by the aeration and agitation of the caustic liquor solution of indoxyl produces a considerable amount of a more or less persistent froth or foam which entangles within it considerable amounts of indigo. Further, the precipitated indigo thus produced possesses a characteristic viscous property and due to the probable entrainment of air or other gases, or to other causes, the apparent specific gravity of the indigo is less than that of the caustic alkali liquor and in consequence the indigo, if permitted, will rise or float and concentrate in the upper portions of the liquor and leave a substantially clear layer of liquor below; for example, it has been found that an original slurry containing about two percent by weight of indigo in suspension will separate under proper conditions into a lower layer of liquor containing very little or no suspended solids and an upper layer containing about six to eight percent of indigo.

The present invention particularly contemplates a process which brings about the formation of these two layers and of separating them, more especially as a continuous operation. The formation of a dilute indigo slurry into two layers wherein most, if not all, of the indigo is concentrated several fold into one of the layers and then separating and filtering this layer, or even both layers, has the economic advantage of increased filter capacity and reduced operating and maintenance costs.

The process may be carried out in various ways and in various forms of apparatus. For example, a continuous separation into two layers of a system comprising indigo in suspension is effected by imparting a flow to the system at a linear velocity sufficiently slow over a suitable distance to permit the indigo to rise and concentrate as a supernatant slurry which is led to a filter, and drawing off the clear liquor below. One form of apparatus suitable for carrying out the process in a continuous manner is shown in the accompanying drawing in which Fig. 1 is a vertical section of a continuous decanter;

Fig. 2 is a horizontal section on the line 2—2 of Fig. 1;

Fig. 3 is a detail in section on line 3—3 of Fig. 2; and

Fig. 4 is a detail in section on line 4—4 of Fig. 2.

The decanter, Fig. 1, comprises a series of superposed pans 10, 11, 12, 13. The uppermost pan receives the slurry through the valve controlled inlet 14. This pan is designed to separate the foam carried by the slurry and for this purpose it is provided with a cover 15 and baffle 16 extending downward from the cover which divides the pan into two chambers 17 and 18. The inlet 14 opens into the chamber 17 and adjacent the baffle is a foam offtake 19. A second foam outlet 20 is provided in the other side of the baffle in the chamber 18 to remove any foam that may be drawn beneath the baffle 16.

These foam outlets are conveniently made of elbows 21 opening upwardly and discharging into pipes 22, Fig. 2, extending through the side of the pan. The outer end 23 of the chamber 18 is cut to form a weir 24 which serves to maintain a fixed depth of liquid flowing through the chamber. The cross sectional area of the stream, as determined by the width of the pan and the height of the weir, is sufficiently large so that the liquid movement is slow enough to cause an appreciable separation of the indigo and leave a layer of clear liquid by the time the stream reaches the weir. For the withdrawal of this lower liquid layer there is provided an outlet pipe 25 which has a slot 26 along its bottom. One end of the pipe is closed by a cap 27; the other end is threaded into one end of a T 28, the opposite end being closed by a plug 29. The lateral opening 30 of the T is ground to fit snugly on the bottom of the pan and encloses a nipple 31 extending upwardly through and welded to the pan bottom, as shown in Fig. 4. The nipple end 32 within the pan is preferably beveled as shown so that the T may be readily placed over it. The end 33 of the nipple below the pan is threaded into an elbow 34 from which extends a pipe 35 that includes a union 36. From an elbow 37 on the end of the pipe 35 is a short length of pipe 38 having a lipped end 39. This arrangement of piping for the withdrawal of liquid constitutes an adjustable overflow as the union permits turning and regulating the height of the lipped end and consequently the quantity of liquid withdrawn.

To avoid agitation of the slurry flowing over the weir and thus creating a foam, a spillway 40 is provided comprised of two sections 41 and 42 which are connected by side pieces for confining the slurry between them. The upper section 41 has a curvature changing from a substantially horizontal to a substantially vertical direction and directs the slurry from the weir while gradually changing its direction of flow to the second or lower section 42 which has a curvature changing from a substantially vertical to a substantially horizontal direction and having its upper end extending above the lower end of said upper section, and causes a further gradual change of flow direction to accord with that in the next pan 11.

Each of the pans 11 and 12 are similarly provided with spillways, weirs 49 and 50 respectively corresponding to weir 24, and liquid offtakes at the outlet end, the direction of flow being reversed in each succeeding pan. The bottom pan 13 likewise has a liquid offtake and a weir 43 over which the slurry flows, and the slurry collects in a tank 44 formed in the end of the pan 13 by the weir. From this tank the thickened slurry is directed by a pipe 45 to a filter or storage tank.

The foam outlets 19 and 20 lead to a pipe 46 that carries the foam to the filter. The bottom outlets discharge into funnels 47 connected to pipe lines 48 that lead the caustic liquor away from the apparatus to storage tanks.

The operation as carried out for the decantation of indigo comprises leading the indigo slurry into the chamber 17. The foam floats on top and is directed by the baffle 16 to the outlet 19. In practice it is found that substantially all of the foam introduced into the decanter is so separated. The slurry passes under the baffle and flows slowly down the length of the chamber 18. During its approach to the weir 24, a layer of clear liquor, as indicated by the practical absence of the blue color of the indigo, forms on the bottom which is withdrawn by the adjustable overflow 38. The rate at which the liquor is withdrawn is regulated by the height of the lipped end 39, and is set to draw off clear liquor free from blue. The slurry passes over the weir and is gradually reversed in its direction of flow by the spillway 40 into the next pan 11, and disturbance of the mixture or other foam producing conditions are thus avoided.

More clear liquor is withdrawn by the adjustable overflow at the departure end of the pan 11 and the remaining slurry is directed to the succeeding pan 12. The separation is continued in pan 12, from which the slurry flows to the bottom pan 13. The final separation in pan 13 gives an indigo slurry of sufficient concentration for satisfactory filtration by any suitable means as, for example, a rotary filter.

If desired the design may be so modified that the thickened slurry from any or all pans will overflow to the filter instead of to the following pan, and the underflow at the same time will flow into the following pan instead of into the storage tanks for clear caustic liquor. This modification is desirable for slurries of such nature that the top layer becomes sufficiently concentrated in one pan to be suitable for filtration, or becomes too viscous to flow readily thru the subsequent pans or that the bottom layer from any pan is not sufficiently clear and requires additional time for separation.

I claim:

1. In a decanting apparatus, the combination of a series of superposed pans, a weir formed at one end of each pan, the weirs of adjacent pans being disposed at the opposite ends of the pans, and a spillway connected with the weir of the top pan and each intermediate pan of the series, each spillway extending into a subjacent pan.

2. A decanting apparatus comprising in combination a series of superposed pans, means for feeding a mixture to said series, weirs forming outlets from said pans, and independent outlets associated with each of said pans and adjacent the weirs for withdrawing liquid near the bottoms of said pans.

3. A decanting apparatus comprising in combination a series of superposed pans, an inlet to said series, means associated with the first pan of said series for removing foam, means for removing solids rising to the top of the liquid and means for securing a flow thru said series of pans with an absence of foam producing conditions.

4. A decanting apparatus comprising in combination a series of superposed pans, means for feeding a mixture to said series, weirs forming outlets from said pans, and adjustable outlets associated with each of said pans and adjacent the weirs for withdrawing liquid near the bottoms of said pans.

5. A decanting apparatus comprising in combination a series of superposed pans, an inlet to said series, means associated with the first pan of said series for removing foam, means for removing solids rising to the top of the liquid, and spillways for gradually directing the flow of solids removed from one pan to a succeeding pan.

6. A decanting apparatus comprising, in combination, a series of superposed pans, a weir formed at one end of each pan, a bottom outlet from each pan adjacent to the weir, a spillway connected with the weir of the top pan and each intermediate pan of the series, each spillway extending into a subjacent pan, an adjustable overflow connected to each bottom outlet, a tank associated with the weir of the bottom pan, an inlet to the top pan, foam separating means in the top pan, and an outlet from said tank.

7. In a decanting apparatus for a flowing slurry having a series of superposed pans, spillways associated with said pans for gradually directing flow from one pan to a succeeding pan, each spillway comprising an upper and a lower section, the upper section having a curvature changing from a substantially horizontal to a substantially vertical direction and the lower section having a curvature changing from a substantially vertical to a substantially horizontal direction, the upper end of said lower section extending above the lower end of said upper section, and side pieces connecting the two sections for confining slurry between the sections.

8. A method of separating indigo from a liquid in which it is so suspended that it has a tendency to float which comprises flowing the mixture continuously through a series of pans positioned at different horizontal planes at a rate permitting indigo to concentrate in the upper portion of the mixture, and continuously skimming by flowing over a weir from an upper pan to a lower pan the indigo which rises to the surface of the mixture.

9. A method of separating indigo from a liquid in which it is so suspended that it has a tendency to float which comprises flowing the mixture continuously through a series of superposed pans at a rate permitting indigo to concentrate in the upper portion of the mixture, and continuously skimming by flowing over a weir from an upper pan to a lower pan the indigo which rises to the surface of the mixture.

10. A method of separating indigo from a liquid in which it is so suspended that it has a tendency to float which comprises flowing the mixture continuously through a series of superposed pans at a rate permitting indigo to concentrate in the upper portion of the mixture, continuously skimming by flowing over a weir from an upper pan to a lower pan the indigo which rises to the surface of the mixture, and withdrawing liquor clarified by the separation of indigo therefrom.

11. A method of separating indigo from a liquid in which it is so suspended that it has a tendency to float which comprises horizontally flowing the mixture continuously through a series of superposed pans at a rate permitting the indigo to concentrate in the upper portion of the mixture, continuously skimming by flowing over a weir from an upper pan to a lower pan indigo which rises to the surface of the mixture, and continuously withdrawing liquid clarified by the separation of indigo therefrom.

12. A method of separating indigo from a liquid in which it is so suspended that it has a tendency to float which comprises horizontally flowing the mixture as a stream through a series of superposed pans at a rate permitting indigo to concentrate in the upper portion of the stream, skimming off at spaced intervals by flowing over a weir from an upper pan to a lower pan indigo which rises to the surface of the stream, and withdrawing at spaced intervals the liquor clarified by the separation of indigo therefrom.

13. A method of separating indigo from a liquid in which it is so suspended that it has a tendency to float and characterized by a tendency to foam which comprises skimming off the foam, horizontally flowing the mixture continuously through a series of superposed pans at a rate permitting the indigo to concentrate in the upper portion of the mixture with substantial absence of foam-producing conditions, skimming off by flowing over a weir from an upper to a lower pan indigo which rises to the surface, and continuously withdrawing liquid clarified by the separation of indigo therefrom.

14. A method of separating indigo from a liquid in which it is so suspended that it has a tendency to float which comprises flowing the mixture continuously through a series of superposed pans at a rate permitting the indigo to concentrate in the upper portion of the mixture, continuously skimming by flowing over a weir from an upper pan to a lower pan the indigo which rises to the surface of the mixture, and withdrawing clarified liquid from a point adjacent the weirs and near the bottoms of said pans.

In testimony whereof I affix my signature.

WILLIAM L. SPALDING.